US009776159B2

(12) United States Patent
Kozyuk

(10) Patent No.: US 9,776,159 B2
(45) Date of Patent: *Oct. 3, 2017

(54) DEVICE FOR CONDUCTING SONOCHEMICAL REACTIONS AND PROCESSING LIQUIDS

(71) Applicant: ARISDYNE SYSTEMS, INC., Cleveland, OH (US)

(72) Inventor: Oleg Kozyuk, North Ridgeville, OH (US)

(73) Assignee: ARISDYNE SYSTEMS, INC., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/217,456

(22) Filed: Jul. 22, 2016

(65) Prior Publication Data

US 2017/0028375 A1    Feb. 2, 2017

Related U.S. Application Data

(60) Provisional application No. 62/199,394, filed on Jul. 31, 2015.

(51) Int. Cl.
*B01F 7/00* (2006.01)
*B01J 19/00* (2006.01)
*B01J 19/10* (2006.01)
*B06B 3/00* (2006.01)

(52) U.S. Cl.
CPC ............ *B01J 19/008* (2013.01); *B01J 19/10* (2013.01); *B06B 3/00* (2013.01); *B01J 2219/0869* (2013.01); *B01J 2219/0877* (2013.01)

(58) Field of Classification Search
CPC .............................. B01J 19/008; B01J 19/1812
USPC ........................................................ 366/304
See application file for complete search history.

(56) References Cited

U.S. PATENT DOCUMENTS

| 5,937,906 A | 8/1999 | Kozyuk |
| 6,012,492 A | 1/2000 | Kozyuk |
| 6,035,897 A | 3/2000 | Kozyuk |
| 2004/0022122 A1 | 2/2004 | Kozyuk |
| 2005/0237855 A1* | 10/2005 | Kozyuk ............ B01F 7/00758 366/304 |

(Continued)

FOREIGN PATENT DOCUMENTS

| RU | 49608 U1 | 11/2005 |
| RU | 2305073 C9 | 8/2007 |

OTHER PUBLICATIONS

Suslick, K. S.,"Sonochemistry", Science, vol. 247, Mar. 23, 1990, pp. 1439-1445.

(Continued)

*Primary Examiner* — Kevin Joyner
(74) *Attorney, Agent, or Firm* — Pearne & Gordon LLP

(57) ABSTRACT

A device for processing a liquid via hydrodynamic cavitation, the device including a housing, a channel element and a rotor, the channel element defining a channel and having at least one discharge orifice extending from the channel perpendicular to the longitudinal axis of the channel element. The rotor has a rotor channel and rotates about the portion of the channel element containing the discharge orifice, to periodically open and close the discharge orifice, thereby creating a water hammer hydraulic pulse in the channel.

14 Claims, 2 Drawing Sheets

(56) References Cited

U.S. PATENT DOCUMENTS

2010/0103768 A1    4/2010  Gordon et al.

OTHER PUBLICATIONS

Mason, T. J.,"Advances in Sonochemistry", vol. 3, 1993, Jai Press Inc., pp. cover,v-ix,1.
Pandit, A. B., Moholkar, V. S., "Harness Cavitation to Improve Processing", Chemical Engineering Process, Jul. 1996, pp. 57-69.
The International Search Report and Written Opinion issued in corresponding International PCT Application No. PCT/US2016/043644; Dated: Nov. 3, 2016.

* cited by examiner

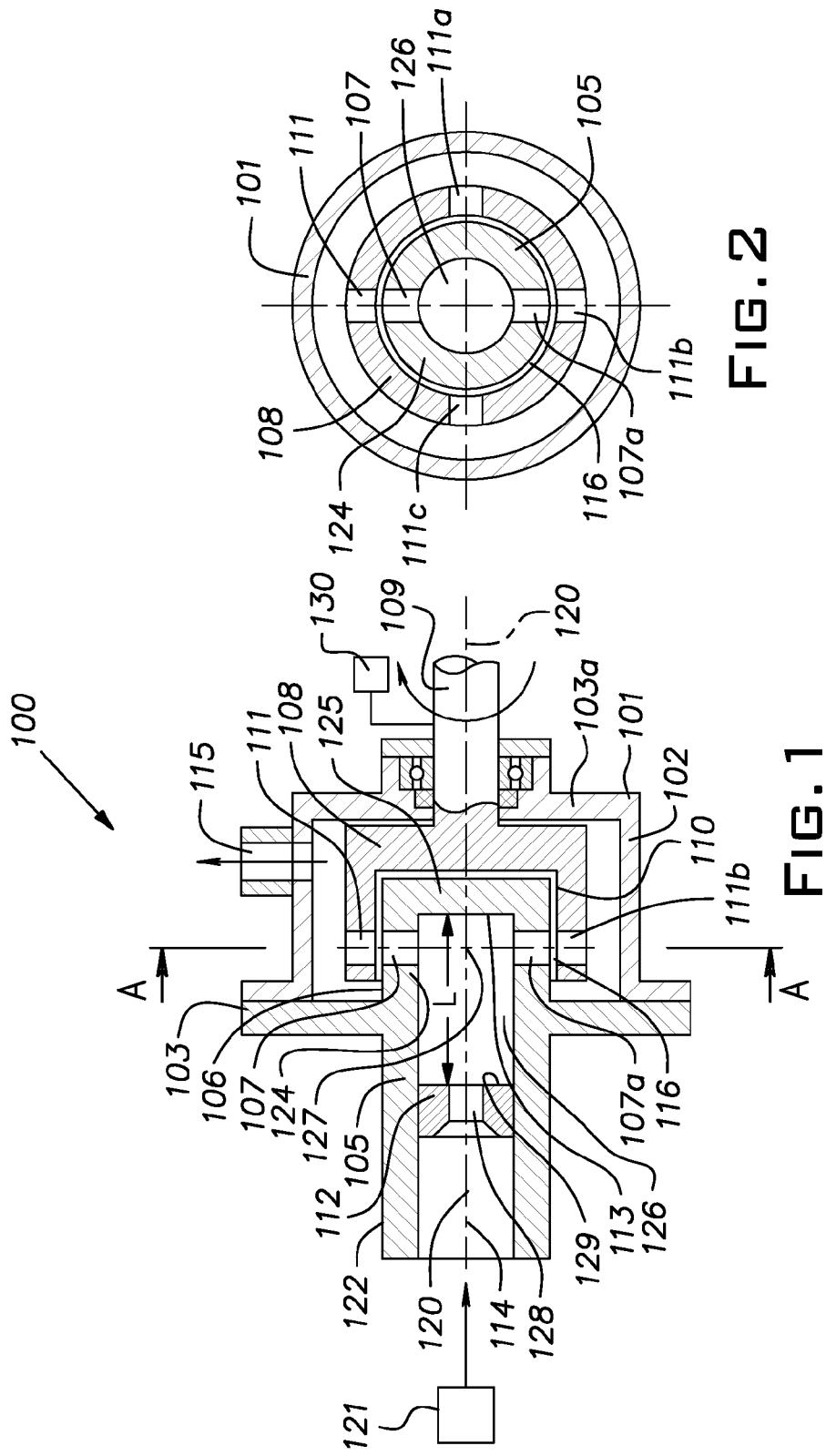

DEVICE FOR CONDUCTING SONOCHEMICAL REACTIONS AND PROCESSING LIQUIDS

FIELD OF THE INVENTION

This invention relates to devices for conducting sonochemical reactions in aqueous and non-aqueous liquid media, to devices utilizing hydrodynamic cavitation effects for conducting the sonochemical reactions and processing liquids utilizing ultra-high energy from the collapse of cavitation bubbles. More specifically, the present invention relates to a device which is effective and useful in the fields of chemistry, electronic materials, biochemistry, water treatment, food, agriculture, medication, and the pharmaceutical industry.

BACKGROUND

Sonochemistry is the application of ultrasound to chemical reactions and processes. The mechanism causing sonochemical effects in liquids is the phenomenon of ultrasonic cavitation. Up to the present time, it is well known that there are many chemical reactions that essentially alter the speed and yield of finished products under the influence of ultrasonic cavitation.

There also exists a great number of chemical reactions that may only proceed under the influence of ultrasonic cavitation. Similar reactions may be accomplished in aqueous as well as non-aqueous, liquid-based media. The main requirement for the realization of similar reactions is the imposition of ultrasonic cavitation on the liquid medium.

Most of the chemical interaction occurs in the cavitation bubble collapse when there is significant compression and heating of the vapor and gas (Timothy J. Mason, "Advances in Sonochemistry", Volume 3. 1993. 292 pp., JAI Press Inc). As the bubble accelerates through the collapse, no heat is lost through the bubble interface in the final collapse stage. Though no heat is lost with respect to the amount stored (adiabatic process), there is vigorous heat flux for a brief instant and a thin thermal boundary layer forms near the bubble interface.

Experimental results have shown that these bubbles have temperatures around 5000 K, pressures of roughly 1000 atm, and heating and cooling rates above $10^{10}$ K/s (K. S. Suslick, Science, Vol. 247, 23 Mar. 1990, pgs. 1439-1445). These high temperatures and pressures can create extreme physical and chemical conditions in otherwise cold liquids.

The following sonochemical effects can be observed in chemical reactions and processes: increase in reaction output and speed, changing of reaction pathway and increase in the reactivity of reagents or catalysts, improvement of phase transfer and activation catalysts, avoidance of catalysts and breakage of molecular bonds, improvement of particle and droplets formations and synthesis.

Common for all sonochemical reactions and processes is that, for the creation of cavitation bubbles in a liquid-based medium, the principle of application of ultrasonic oscillations on the liquid-based medium is used. The basic equipment which is used in sonochemistry appears as ultrasonic devices of various designs.

This method of conducting sonochemical reactions is sufficiently effective for processing small volumes of liquids and has found its chief application on the level of laboratory research. Transitioning to large scale volumes, however, which are used in industry, is significantly difficult and even at times impossible. This is associated with the problems which arise during the scaling up of cavitation that is produced with the aid of ultrasonic oscillations.

It is possible to avoid these shortcomings, however, by producing or improving the quality of the initiator of sonochemical reactions, cavitation bubbles, through the course of hydrodynamics. An example of using hydrodynamic cavitation for conducting sonochemical reactions is presented in the work of: Pandit A. B., Moholkar V. S., "Harness Cavitation to Improve Processing," Chemical Engineering Progress, July 1996, pgs. 57-69.

A method disclosed in U.S. Pat. Nos. 5,937,906; 6,012,492; 6,035,897, for conducting sonochemical reactions and processes using large scale liquid medium volumes involves passing a hydrodynamic liquid flow at a velocity through a flow through channel internally containing at least one element to produce a local constriction of the hydrodynamic liquid flow. The velocity of the liquid flow in the local constriction is at least 16 m/sec. A hydrodynamic cavitation cavern is created downstream of the local constriction, thereby generating cavitation bubbles. The cavitation bubbles are shifted with the liquid flow to an outlet from the flow through channel and the static pressure of the liquid flow is increased to at least 12 psi. The cavitation bubbles are then collapsed in the elevated static pressure zone, thereby initiating the sonochemical reactions and processes.

The existing methods are not sufficient to generate significant compression energy release during bubble collapse.

The compression of the bubbles during cavitation in the disclosed patents under static pressure $P_{st}$ increased in the liquid flow. Increasing static pressure of the liquid flow is a linear process and $P_{st}$ cannot be higher than 0.3 P (to avoid cavitation suppression), wherein P is the static pressure before the local constriction where a hydrodynamic liquid flow is passed through a flow-through local constriction; $P_{st}$ is the static pressure downstream of the local constriction. In most cases cavitation bubble collapse occurs when static pressure surrounding the bubble equals $P_{st}=(0.05-0.1)$ P.

There are different approaches to account for the shockwave produced from the collapse of a cavitation bubble. An approximate relationship for the pressure peak amplitude, $P_p$, given by Brennan is: $P_p=100$ R $P_{in}/r$, where R is the maximum bubble radius, r is the distance from the bubble, and $P_{in}$ is the external pressure surrounding the bubble which initiated cavitation bubble collapse ($P_{in}=P_{st}$). (C. E. Brennan, Cavitation and Bubble Dynamics, Oxford University: New York, 1995.)

Assuming adiabatic bubble collapse, maximum temperature inside a collapsing bubble can be calculated by:

$$T_{max} = T_0 \left(\frac{P_{in}}{P_v}\right)^{(\gamma-1)/\gamma},$$

where $T_0$ is the liquid temperature, $P_{in}$ is the external pressure surrounding the bubble which initiated cavitation bubble collapse ($P_{in}=P_{st}$), $\gamma$ is the ratio of specific heats of gas or vapor inside cavitation bubble before collapse, indicating how much heat is released from the gas during the adiabatic compression and $P_v$ is the gas or vapor pressure inside cavitation bubble before collapse.

Thus, utilization of the recovering static pressure $P_{st}$ in the liquid as external pressure which initiated cavitation bubble collapse cannot generate very high pressure the shockwave and temperature from cavitation bubble collapse and leads to a low intensity of sonochemical reactions and decrease the degree of heating the medium.

Accordingly, there is a continuing need for alternative methods of realizing sonochemical reactions which can provide more effective utilization of the energy of the hydrodynamic flow.

The present invention contemplates a new and improved device for conducting sonochemical reactions and processes that makes use of hydrodynamic cavitation for generation of controlled shockwave pressure and temperature conditions in liquids and carries out an ultrafine crush treatment for liquid materials, or achieves effective chemical reactions of liquid materials.

SUMMARY OF THE INVENTION

A device for processing a liquid comprising a housing, a channel element and a rotor, the channel element being connected to the housing and extending at least partially within the housing, a distal portion of the channel element having a cylindrical external surface, the channel element having a first longitudinal axis, the channel element having at least one discharge orifice having a second longitudinal axis which extends through a point on the first longitudinal axis and is perpendicular to the first longitudinal axis, the rotor being mounted on a shaft and being located within the housing, the rotor having a cylindrical internal surface facing the channel element cylindrical external surface, the rotor having at least one rotor channel having a third longitudinal axis which is perpendicular to the first longitudinal axis, the rotor being rotatable about the distal portion of the channel element such that, as the rotor rotates, the rotor channel will periodically line up with the discharge orifice so that the discharge orifice is open, the channel element having at least one local constriction which defines an opening and which is located upstream from the discharge orifice.

BRIEF DESCRIPTION OF THE DRAWINGS

FIG. 1 is a longitudinal cross-sectional view of a device according to the invention that can be used for conducting sonochemical reactions and processes;

FIG. 2 is a cross-sectional view of the device shown in FIG. 1, taken along the plane defined by line A-A in FIG. 1;

DETAILED DESCRIPTION OF PREFERRED EMBODIMENTS OF THE INVENTION

Figure 3:
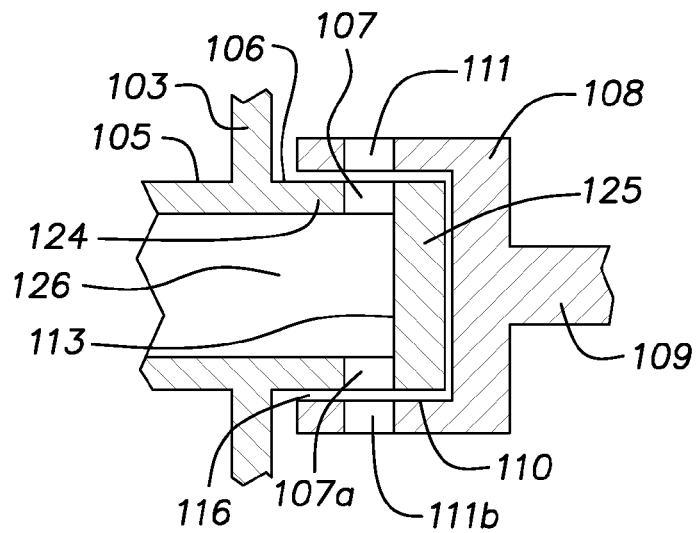
FIG. 3 is a longitudinal cross-sectional view of an alternative embodiment of a portion of the device of FIG. 1.

Herein, when a range, such as 5-25 (or 5 to 25) is given, this means preferably at least 5 and, separately and independently, preferably not more than 25.

Referring now to the drawings, which are for purposes of illustrating embodiments of the invention only and not for purposes of limiting the same. FIGS. 1 and 2 show one embodiment of a device 100 for conducting sonochemical reactions and processes in liquids. The device 100 can include a housing 101 defined by a cylindrical housing wall 102 having a longitudinal axis 120, and a pair of flat or substantially flat end walls 103, 103a. As shown, cylindrical stationary channel element 105 has the longitudinal axis 120 and is mounted in the end wall 103 of the housing 101. Channel element 105 has a proximal portion 122 and a distal portion 124.

Channel element 105 defines at least one inlet port 114 and a channel or initial channel 126. Pump 121 supplies liquid to inlet port 114 under pressure. Channel 126 is cylindrical as shown but can be rectangular, square or polygonal in cross section. Distal portion 124 has a cylindrical external surface 106 (facing the housing wall 102) and an end wall 125.

Channel element 105 defines a plurality of discharge orifices 107, 107a, each having a longitudinal axis which (a) originates at central point 127 on the longitudinal axis 120 and (b) extends perpendicular to the longitudinal axis 120. Two discharge orifices are shown, but there can alternatively be 3, 4, 5, 6, 7, 8, 9, 10, 11, 12 or more discharge orifices, preferably spaced symmetrically around the channel element 105 as shown.

As shown, rotor 108 is located within the housing 101 and is mounted on shaft 109 extending within the housing 101 and has a cylindrical internal surface 110 facing the external surface 106. The shaft 109 is connected to a motive means 130, such as a motor, effective to rotate the rotor 108. The gap 116 between internal surface 110 and external surface 106 is preferably substantially uniform around the distal portion 124 of the channel element 105 and is preferably 10-1000, 10-500, 10-300, 10-200 or 10-100, microns.

Rotor 108 is provided with at least one radially-extending rotor channel 111 (four are shown, as 111, 111a, 111b, 111c). Alternatively, 2, 3, 5,6, 7, 8, 9, 10, 11, 12 or more rotor channels can be provided, preferably spaced symmetrically around the rotor 108 as shown. The rotor channels are preferably positioned such that rotor 108 can rotate to a position where each longitudinal axis of each discharge orifice coincides, at the same time, with the longitudinal axis of a rotor channel, such as is shown in FIG. 2. As shown in FIGS. 1 and 2, the rotor channel 111 will periodically line up with the discharge orifice 107 so that the discharge orifice 107 is open and, as the rotor 108 rotates, the discharge orifice 107 will periodically be closed by being covered by the internal surface 110 of the rotor 108.

Figure 4:
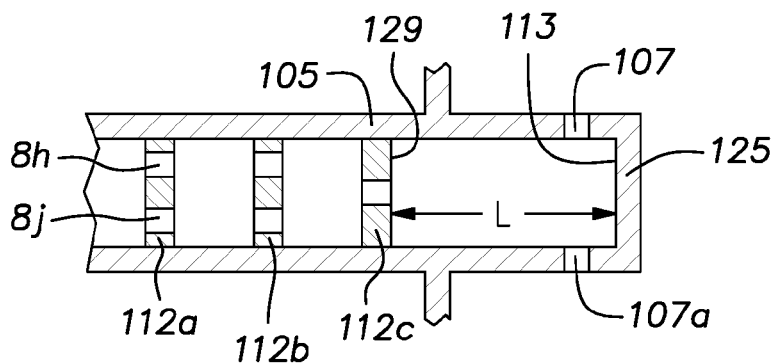
FIG. 4 is a longitudinal cross-sectional view of an alternative embodiment of a portion of the device of FIG. 1.
Figure 5:
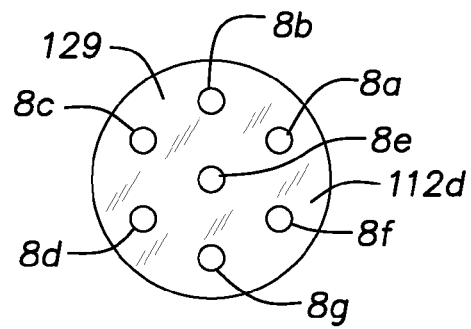
FIG. 5 is an elevational view of the downstream face or side of an alternative embodiment of a local constriction.

Channel element 105 comprises at least one local constriction 112, which defines an opening 128 and which can be at least an orifice, nozzle, baffle body or aperture as shown or as is known in the art (the contents of U.S. Pat. No. 5,937,906 are incorporated herein by reference; all of the local constrictions shown therein can be used in the present invention), the downstream end 129 of the local constriction or of the opening or of the orifice or aperture being located at a distance L from the surface 113 of the end wall 125. The surface 113 and the downstream end 129 are preferably flat or substantially flat and preferably oriented perpendicular to longitudinal axis 120. FIG. 4 illustrates an alternative embodiment wherein three local constrictions 112a (with 2 openings 8h, 8j), 112b (with 2 openings) and 112c (with 1 opening) are shown in series. The distance L is measured from the downstream side or face 129 of the most downstream local constriction (eg., 112c). There can be 1, 2, 3, 4, 5, 6, 7, 8, 9, 10 or more local constrictions in series. FIG. 5 shows the downstream face or side 129 of an alternative local constriction 112d, having openings 8a, 8b, 8c, 8d, 8e, 8f, 8g, which are arranged in parallel, that is, each of these openings is a channel extending through the local constriction 112d in a direction parallel to longitudinal axis 120. Local constriction 112d can have 2, 3, 4, 5, 6, 7, 8, 9, 10 or more openings/channels in parallel, preferably arranged symmetrically. When the local constrictions are in a series, they can all have only one opening (like 112 or 112c), all have a plurality of openings in parallel (eg. 112a or 112d) or be a mixture of any combination thereof, eg., the first one has 6 openings in parallel, the second one has one opening, and the third one has 4 openings in parallel. The openings in the local constrictions are preferably cylindrical with a diameter of at least 0.1, 0.3, 0.5, 1, 5, 10, 15, 20, 30, 40, 50 or 60 mm or more, preferably 0.1-60 mm or more, and preferably have a cross sectional area (whether cylindrical or not) corresponding to at least the cross sectional areas of these cylindrical diameters. Each opening can have a different diameter or cross-sectional area.

The channel 126 is preferably cylindrical and preferably has a diameter and a cross sectional area (whether cylindrical or not) which is at least 1, 2, 4, 5, 10, 20, 30, 50, 75, 100, 200, 300, 400, 500 or 600, percent (or more) bigger than the opening 128 in the local constriction 112.

The cross sectional area of the channel 126 is preferably substantially the same as the combined cross sectional areas of all the discharge orifices.

Discharge orifices 107, 107a and rotor channels 111, 111a, 111b, 111c can have a cylindrical, square, rectangular, polygonal or other cross sectional shape and, in one example, the transverse surface area of the rotor channel is equal to or larger than the transverse surface area of the discharge orifice, for example, not more than 1, 2, 3, 5, 7, 9, 10, 15, 20, 30, 40, 50, 70, 90, 100, 200, 300 or 400 percent greater than the transverse surface area of the discharge orifice.

In FIG. 1, the discharge orifices 107, 107a are located a short distance in front of surface 113. Alternatively, as shown in FIG. 3, each discharge orifice can have an inner surface which is tangent with, or coplanar with, the plane defined by surface 113.

Housing 101 has an outlet port 115 to allow the exhaust or exit of liquid which has been processed.

The desirable or preferred distance L can be calculated using the equation: $L \geq 0.5\,c\,t$, where t is the time period in seconds that it takes to close the discharge orifices, that is, to go from open to closed, L is the length in meters, and c is the speed of sound in the liquid in meters per second.

The length L is preferably at least 5, 10, 20, 30, 40, 50, 70, 100, 200, 300, 400, 500, 600, 700, 800, 900, 1000 or 1250 mm.

The rotor preferably rotates at at least 500, 700, 900, 1000, 1500, 2000, 2500, 3000, 3500, 4000, 5000, 6000, 7500 or 10,000 RPM. The time period (t) that it takes to close the discharge orifices, that is, to go from open to closed, is preferably less than 0.0000068, 0.000027, 0.000067, 0.00013, 0.00067, 0.001, 0.0013, 0.002 or 0.01 seconds.

As the rotor 108 rotates, each discharge orifice, e.g., 107, 107a, is simultaneously covered by a rotor channel, e.g., 111, 111a, 111b, 111c, as shown in FIG. 2, so that all the discharge orifices are simultaneously open, and then they are completely covered or blocked by the internal surface 110 of the rotor 108 so that all the discharge orifices are simultaneously closed. The faster the rotor rotates, the shorter is the time period that it takes the discharge orifices to simultaneously go from open to closed. As shown in FIG. 2, discharge orifice 107 is open, and discharge orifice 107 will be closed when rotor 108 rotates 45 degrees.

The device 100 generally provides for introduction of a liquid or liquid media into the inlet port 114 and through the local constriction 112 where formations of hydrodynamic cavitation bubbles are generated downstream of the local constriction 112.

The preferred time period t is calculated using the equation: $t \leq 2\,L/c$.

In operation, pump 121 forces processing liquid through inlet port 114 and the liquid flows through local constriction 112. As the liquid stream passes through the local constriction 112, static pressure applied by pump 121 to the liquid forces a liquid jet through the local constriction 112 and generates a liquid jet containing hydrodynamic cavitation bubbles, for example, downstream of local constriction 112 in channel 126. The liquid then flows through the discharge orifices 107, 107a.

When the discharge orifice 107 and the rotor channel 111 are in the open position, as shown in FIG. 2, the processing liquid flows through discharge orifice 107 and rotor channel 111 to the outlet port 115.

The sudden blockage of processing liquid through all the discharge orifices and thus through channel 126 creates a sudden change in liquid velocity and the kinetic energy is converted to pressure energy, in other words a water hammer hydraulic pulse is produced in channel 126 due to all the discharge orifices being suddenly and simultaneously closed. In this manner, the rotor 108 acts as a rotational dynamic valve capable of producing hydraulic pulses for converting kinetic energy into pressure energy.

This pulse of pressure is propagated at the velocity of sound from the surface 113 and in a direction against the original flow direction (i.e. arrow entering inlet 114) and the pulse is reflected at the local constriction 112.

The pressure pulse or surge reaches its maximum height when the time t is: $t \leq 2\,L/c$, where t, c and L are as defined above.

The amount of the pulse pressure increase upstream of a fast-acting valve can be approximated using the classic Joukowski equation: $P_A = \rho c\,v$, where $P_A$ is the magnitude of the water hammer hydraulic pulse pressure (Pa), $\rho$ is the density of the liquid (kg/m$^3$), v is the initial velocity of the liquid in the channel (e.g., channel 126) before closing (m/s).

From the Joukowski equation, it is clear that the larger the initial velocity of the liquid in the channel before closing and the larger the speed of sound in the liquid, the greater the magnitude of the hydraulic pulse pressure. The velocity of the liquid within the length L of the channel (channel 126) before closing has to be at least 1.4 m/sec at the exit from the channel 126 for supporting the presence of cavitation bubbles in the channel. More preferably, the velocity of the liquid in the channel 126 before closing is at least 2, 3, 4, 5, 6, 7, 8, 9, 10, 20, 30, 40, 50, 60, 70, 80, 90, 100, 150, 200, 300, 400, 500 or 600 m/sec or more. To maximize the hydraulic pulse pressure $P_A$, the leakage through the gap 116 between the rotor 108 and the channel element 105 must be minimized.

This water hammer hydraulic pulse pressure $P_A$ can be several orders of magnitude higher than the static pressure in the liquid, for example, the inlet pressure of the liquid at inlet port 114. Elevated hydraulic pulse pressure $P_A$ propagates through channel 126 from the surface 113 against the original flow direction and collapses the cavitation bubbles in the liquid jet containing hydrodynamic cavitation bubbles, for example, downstream of local constriction 112 in channel 126. Elevated hydraulic pulse pressures $P_A$ are generally beneficial for the generation of ultra-high controlled pressure shockwaves and temperature conditions in liquids that result from the collapse of cavitation bubbles.

Shockwaves produced from the collapse of cavitation bubbles can be measured based on the Brennan equation (C. E. Brennan. Cavitation and Bubble Dynamics. Oxford University: New York, 1995.) and will be: $P_p=100 R P_A/r$, where R is the maximum bubble radius, r is the distance from the bubble, and $P_A$ is the external hydraulic pulse pressure which initiated cavitation bubble collapse.

The maximum temperature inside an adiabatically collapsing bubble will be:

$$T_{max} = T_0 \left(\frac{P_A}{P_v}\right)^{(\gamma-1)/\gamma},$$

where $T_0$ is the liquid temperature in the device, $P_A$ is the external hydraulic pulse pressure which initiated cavitation bubble collapse, $\gamma$ is the ratio of specific heats of gas or vapor inside the cavitation bubble before collapse, indicating how much heat is released from the gas during the adiabatic compression, and $P_v$ is the gas or vapor pressure inside the cavitation bubble before collapse.

Those conditions allow the utilization of more effective hydrodynamic cavitation regimes for conducting sonochemical reactions and processes.

The processing liquids which can be used in the present invention include water, aqueous liquids, organic liquids and mixtures thereof. The organic liquids can be low, medium and high molecular weight liquids, such as monomers, polymers, oligomers, plant oils, fats, resins and mixtures thereof. The processing liquids can be any liquids which are presently used in the art of hydrodynamic cavitation.

The liquids can be comprised of a mixture of two or more liquids such as one liquid soluble in or miscible with another liquid as well as mutually insoluble or immiscible liquids, for example, in the form of emulsions. Furthermore, the liquids used in the invention can carry solid or semisolid particles or mixtures thereof. For example, the liquid can carry particles which act as a reactant, a filler or a catalyst. Mixtures of different particles can be carried by the liquid. The liquid can also carry a gaseous component, such as air, oxygen, nitrogen or carbon dioxide.

Thus, utilization of the hydraulic pulse pressure in the liquid flow for compression of the cavitation bubbles is an effective method that leads to a high intensity of sonochemical reactions and an increase in the degree of heating of the medium. Use of the devices described herein can increase the rate of chemical reactions, cause reactions to occur under less restrictive conditions, reduce the number of steps required in a reaction or reaction chain, and enhance catalyst efficiency or initiate of reduction at carbon-carbon bonds.

The present invention can be used with respect to the following sonochemical reactions: preparation of high purity, narrow size distribution nanoparticles and emulsions with uniform shapes; improvement of the performance of phase transfer catalysts and the reactivity of catalysts or reagents; degassing of the liquids and hydrolysis non hydratable phospholipids in oil, promote conversion of dissolved calcium and bicarbonate ions into calcium carbonate and microbial cell disruption, treatment of various bio-fuels, increases both yield and temperature, producing a filled resin to provide electrically and thermally conductive materials.

More specifically, the present invention relates to a reaction and processes method which are effective and useful in the fields of chemistry, electronic materials, biochemistry, agriculture, medication, and the pharmaceutical industry.

It will be understood that this invention is not limited to the above-described embodiments. Those skilled in the art having the benefit of the teachings of the present invention as hereinabove set forth, can effect numerous modifications thereto. These modifications are to be construed as being encompassed within the scope of the present invention as set forth in the appended claims. It will be apparent to those skilled in the art that many modifications, variations, substitutions, and equivalents for the features described above may be effected without departing from the spirit and scope of the invention as defined in the claims to be embraced thereby. A preferred embodiment has been described herein. It will be further apparent to those skilled in the art that the above devices and methods may incorporate changes and modifications without departing from the general scope of this invention; it is intended to include all such modifications and alterations insofar as they come within the scope of the appended claims.

What is claimed is:

1. A device for processing a liquid comprising a housing, a channel element and a rotor, the channel element being connected to the housing and extending at least partially within the housing, a distal portion of the channel element having a cylindrical external surface, the channel element having a first longitudinal axis, the channel element having at least one discharge orifice having a second longitudinal axis which extends through a point on the first longitudinal axis and is perpendicular to the first longitudinal axis, the rotor being mounted on a shaft and being located within the housing, the rotor having a cylindrical internal surface facing the channel element cylindrical external surface, the rotor having at least one rotor channel having a third longitudinal axis which is perpendicular to the first longitudinal axis, the rotor being rotatable about the distal portion of the channel element such that, as the rotor rotates, the rotor channel will periodically line up with the discharge orifice so that the discharge orifice is open, the channel element having at least one local constriction which defines an opening and which is located upstream from the discharge orifice.

2. The device of claim 1, wherein the rotor is rotatable about the distal portion of the channel element such that, as the rotor rotates, the discharge orifice is periodically closed by being covered by the internal surface of the rotor.

3. The device of claim 1, wherein the discharge orifice and the rotor channel have a cross-sectional shape selected from the group consisting of circle, square, rectangle and polygon.

4. The device of claim 1, wherein the rotor channel has a cross-sectional surface area which is equal to or greater than the cross-sectional surface area of the discharge orifice.

5. The device of claim 1, wherein said channel element comprises an inlet port.

6. The device of claim 1, wherein said housing has an outlet port to allow the exhaust of liquid which has been processed.

7. The device of claim 1, wherein said local constriction is an orifice, nozzle, baffle body or aperture.

8. The device of claim 1, wherein the shaft is connected to a motive means effective to rotate the rotor.

9. The device of claim 1, the channel element having an end wall downstream from the local constriction, wherein said local constriction is located at a distance L from the end wall, the distance L being calculated using the equation: $L \geq 0.5$ t c, where L is the distance in meters, t is a pre-selected time period in seconds that it takes for the discharge orifice to go from open to closed, and c is the speed of sound in meters per second in a pre-selected liquid to be processed in the device.

10. The device of claim 1, wherein the channel element has a second discharge orifice which has a longitudinal axis which extends through said point on the first longitudinal axis and is perpendicular to the first longitudinal axis, and wherein the rotor has a second rotor channel having a longitudinal axis which is perpendicular to the first longitudinal axis.

11. The device of claim 1, wherein the channel element has an end wall downstream from the local constriction, the end wall having a surface facing the local constriction, the discharge orifice having an inner surface which is tangent with, or coplanar with, a plane defined by the surface of the end wall.

12. The device of claim 1, wherein the channel element has a plurality of local constrictions in series.

13. The device of claim 12, wherein one of said plurality of local constrictions defines a plurality of openings.

14. The device of claim 1, wherein the local constriction defines a plurality of openings.

* * * * *